Jan. 9, 1923.
M. G. PAIN.
SPRING MOTOR.
ORIGINAL FILED DEC. 10, 1918.
1,441,743.
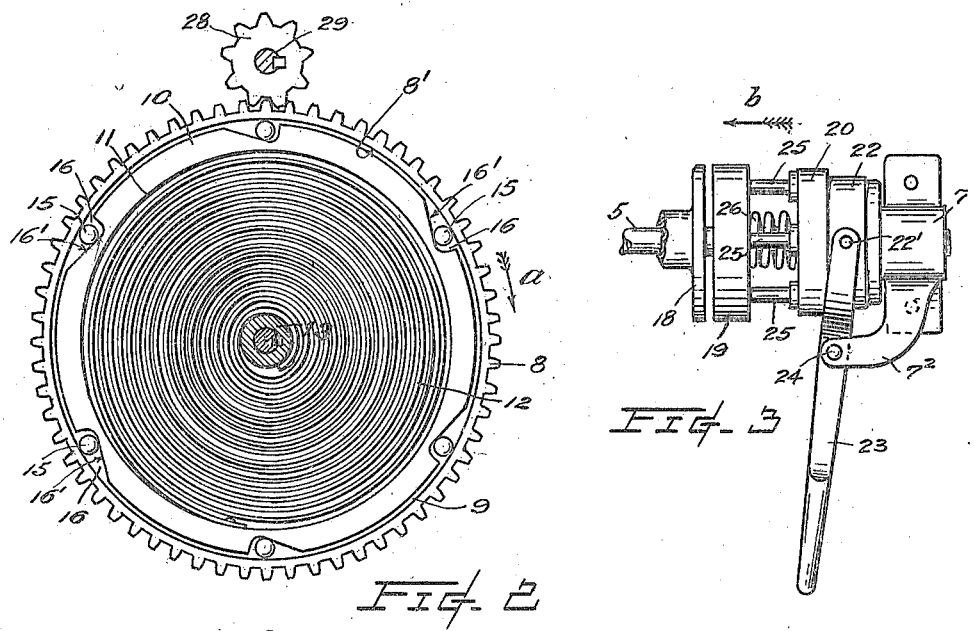
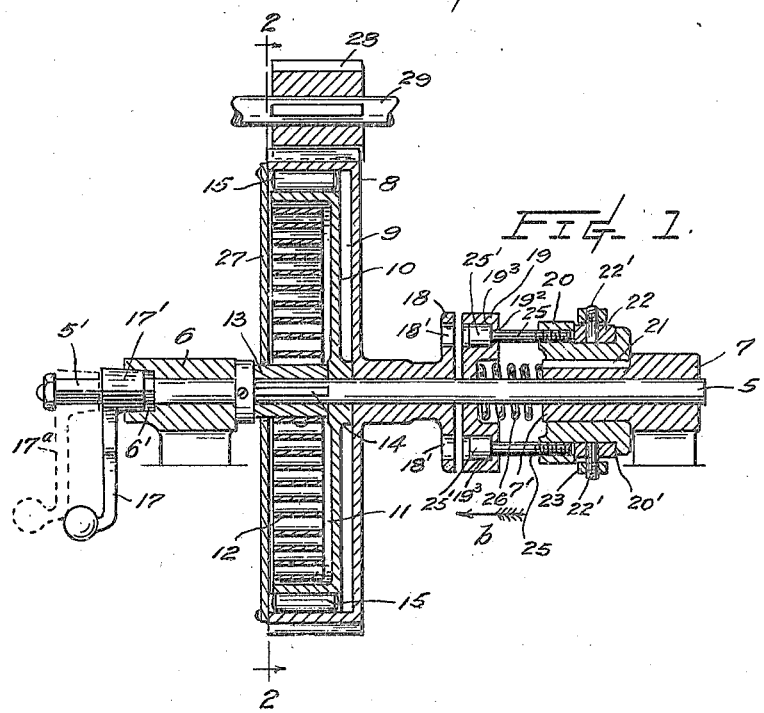
INVENTOR:
Maria G. Pain
BY
Pierre Barnes
ATTORNEY Patented Jan. 9, 1923.

1,441,743

UNITED STATES PATENT OFFICE.

MARIA G. PAIN, OF LITTLEROCK, WASHINGTON.

SPRING MOTOR.

Application filed December 10, 1918, Serial No. 266,062. Renewed October 25, 1922. Serial No. 596,896.

*To all whom it may concern:*

Be it known that I, MARIA G. PAIN, a subject of the King of England, residing at Littlerock, in the county of Thurston and State of Washington, have invented certain new and useful Improvements in Spring Motors, of which the following is a specification.

This invention relates to spring-actuated motors; and its object is to produce a device of this character which may be manufactured at a moderate cost and advantageously used for a number of purposes as, for example, operating emery wheels, coffee mills, etc.

The invention is illustrated in the accompanying drawings, in which Figure 1 is a longitudinal vertical section; Fig. 2 is a transverse section through 2—2 of Fig. 1; and Fig. 3 is a detail plan view.

In said drawings, the reference numeral 5 designates a shaft journaled in boxes 6 and 7. Loosely mounted on said shaft is a master gear 8 having peripheral spur teeth. Said gear is provided with a chamber 9 to accommodate a wheel 10 which is also loosely mounted upon the shaft 5 and is provided with a chamber 11 to accommodate a coil spring 12. One end of this spring is secured to a collar 13 which is secured, as by a key 14, to the shaft, and its other end is secured to the rim of the wheel 10.

15 represent rollers positioned in notches 16 in the outer periphery of said wheel and are arranged to engage the inner circumferential surface $8^1$ of gear 8 and the relatively inclined surfaces $16^1$ of the respective notches for coupling the gear to the wheel when the former is to be rotated by the wheel in the direction indicated by arrow $a$ in Fig. 2, and coupling the gear to said wheel when winding the spring 12.

Said spring is wound by means of a crank handle 17 having a boss $17^1$ formed with a polygonal aperture through which extends a correspondingly shaped portion $5^1$ of said shaft. The perimeter of said boss is also polygonal and desirably tapering, as shown, to fit into a corresponding recess $6^1$ provided in the adjacent end of the shaft bearing box 6.

When the crank-handle boss is within the recess $6^1$, as shown by full lines in Fig. 1, said boss serves to secure the shaft against rotation; but when the crank handle is withdrawn from said recess, as indicated by broken lines $17^a$, the shaft may be rotated by the crank handle for winding the motor spring 12.

Secured to or formed integral with the master gear wheel 8 is a disk brake-element 18, and 19 represents a disk brake-element complementary thereto which is slidable axially upon the shaft and in which the latter is free to rotate.

20 represents a sleeve mounted upon a hub $7^1$ formed on the aforesaid journal box 7. Said sleeve is connected to the hub $7^1$ for movements axially of shaft 5 by a spline 21.

22 represents a ring rotatable in a peripheral groove $20^1$ of said sleeve and is provided with horns $22^1$ engaging in the bifurcations of a forked lever 23 fulcrumed at 24 to a bracket arm $7^2$ of box 7.

Secured to said sleeve are prongs 25 arranged parallel to the shaft and extending through holes $19^2$ provided in brake element 19. Said holes are counterbored to afford annular shoulders $19^3$ which are normally held against the heads $25^1$ of said prongs by a spiral spring 26 interposed between the brake element 19 and the hub $7^1$. The length of the prong heads $25^1$ is less than the depths of the respective counterbores so that when the lever 23 is actuated to shift the sleeve 20 in the direction of arrow $b$, Figs. 1 and 3, the spring 26 will serve to cause the brake element 19 to be brought into frictional engagement with the brake element 18.

A further movement of the sleeve will effect the advancement of the prongs to engage the same in holes $18^1$ provided in brake element 18, thereby positively locking the two elements together for securing the master gear wheel when the motor is to remain idle and when the shaft is being turned by the handle 17 for winding the power spring 12.

To protect the spring from dirt, a cover 27 is desirably used to close the open end of the gear chamber 9.

28 represents a spur pinion mounted on a shaft 29 to be driven from the gear 8 for operating a machine.

In operation, the spring 12 affords power which acts through the wheel 10 and coupling rollers 15 to rotate the master gear 8. By advancing the brake element 19 into frictional engagement with the element 18, the speed of the gear 8 may be controlled and stopped, if desired, by suitably manipulating the lever 23.

The element 19 is set forward by the spring 26 when the prongs 25 are moved with the sleeve 20 in the direction of arrow $b$ (Fig. 1). In such action the spring 26 causes the element 19 to follow the prong-heads $25^1$ until the element 19 encounters the other element 18, whereupon the frictional engagement of the brake occurs.

A further advancing of the sleeve 20 causes the prong-heads to engage in the holes $18^1$ to positively secure the gear 8 from rotating.

What I claim, is—

1. A spring motor comprising a shaft, journal boxes therefor, a wheel mounted on said shaft, a spiral spring connecting said wheel to the shaft, a second wheel, means to couple said wheels for movement in one rotary direction, means to releasably secure said second-named wheel from rotating, and means engaged with said shaft and selectively engageable with one of said boxes for use in securing the shaft from rotation when the machine is operable and disengageable from the said box for use in turning the shaft to effect winding of the spring.

2. In a spring motor, a wheel, a chambered second wheel therein, a shaft carrying said wheels, a spring contained in the chamber of said second wheel and having its ends respectively connected thereto and to the shaft, means to couple the wheels for rotating in one direction, and brake devices arranged to be actuated to successively engage the first-named wheel frictionally and positively.

3. In a spring motor, a shaft, bearing boxes therefor, two wheels mounted for independent rotary motion on the shaft, devices serving to couple said wheels to turn in unison in one rotary direction, a spring operatively connecting one of said wheels to the shaft, brake devices for controlling the other of said wheels, and means adapted to be interchangeably employed for rotating the shaft to wind said spring or to secure the shaft against rotating.

Signed at Olympia, Wash., this 30th day of November, 1918.

MARIA G. PAIN.

Witnesses:
JOHN BUSTRACK,
MARY B. PORTMAN.